May 2, 1961   P. RIEGGER ET AL   2,982,594
TACHOGRAPH
Filed July 7, 1955   8 Sheets-Sheet 1

May 2, 1961  P. RIEGGER ET AL  2,982,594
TACHOGRAPH
Filed July 7, 1955  8 Sheets-Sheet 2

May 2, 1961  P. RIEGGER ET AL  2,982,594
TACHOGRAPH
Filed July 7, 1955  8 Sheets-Sheet 3

May 2, 1961 P. RIEGGER ET AL 2,982,594
TACHOGRAPH
Filed July 7, 1955 8 Sheets-Sheet 4

P. RIEGGER ET AL 2,982,594

TACHOGRAPH

Filed July 7, 1955

FIG. 16

United States Patent Office 2,982,594
Patented May 2, 1961

2,982,594
TACHOGRAPH

Paul Riegger, Karl Vogtlin, and August Becker, Villingen, Black Forest, Germany, assignors to Kienzle Apparate G.m.b.H., Villingen, Black Forest, Germany Filed July 7, 1955, Ser. No. 520,551

Claims priority, application Germany Nov. 3, 1954

9 Claims. (Cl. 346—18)

The present invention relates to a tachograph or a recording device for a tachometer, more particularly for motorized vehicles, such as trucks, automobiles, buses and vehicles on rails. Such vehicles are, as a rule, provided with a device which indicates the mileage, the periods of motion and of rest, and most important, the speed of the vehicle. The indications are made by recording devices on recording sheets which are passing said devices in dependence on the speed and the mileage to be recorded. The record sheets are mostly in form of circular disks.

The records made on these sheets serve for the control of the performance of a vehicle and the subsequent investigation of the causes of accidents, if any.

It is the object of the present invention to provide a device which is better suited than those currently used for controlling the vehicles and for investigating the causes of accident.

In order to achieve the object indicated above, the machine according to the invention is provided with means capable of indicating and/or recording further valuable data and occurrences which are important for the evaluation of the performance of a vehicle. Such additional data are for instance the r.p.m. of the motor, the time at which a gear is shifted, and the actuation of the brakes; these are indicated and/or registered in accordance with the invention.

Among the indications and recordings made by the device according to the invention are not only the exact moment at which braking takes place, but also the manner in which the brake operates, for instance manual braking, braking by foot pedal, and more particularly in heavy trucks and buses the additionally used motor-controlled brakes of any kind; also indicated are the braking period and the braking pressures.

The invention also relates to the suitable modes of recording on recording disks hitherto used or on additional recording disks, as well as the advantageous arrangement of the recording disks, the recording devices proper, and the drive means for said devices.

Finally the invention relates to the proper evaluation of the recording data and comprises a device for carrying out such evaluation. Further particulars of the invention will become apparent from the detailed description given herein below with reference to the accompanying drawings, but it should be understood that these are given by way of illustration and not of limitation and that many changes in the details may be made without departing from the spirit of the invention.

Figure 1:
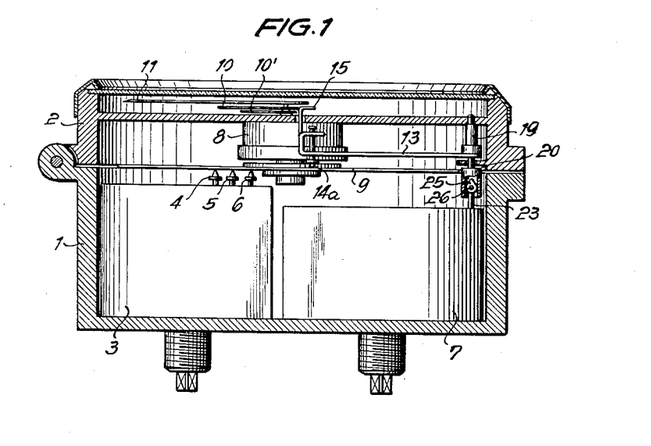
Fig. 1 illustrates, in section, a tachograph with built-in metering and recording device for the r.p.m.
Figure 2:
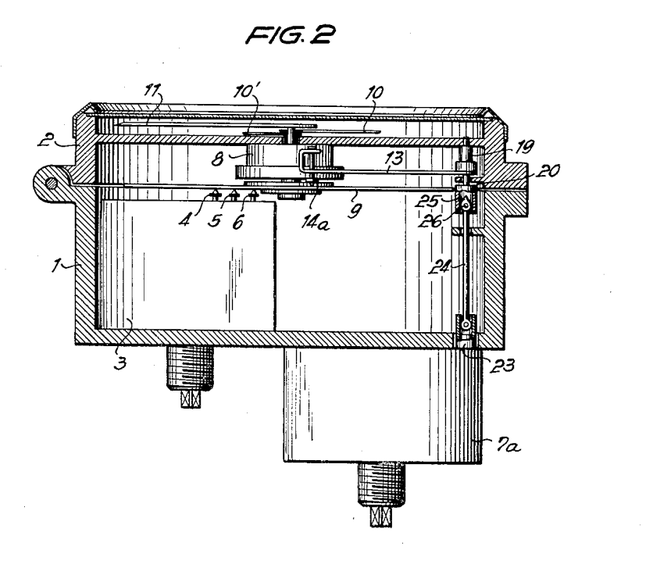
Fig. 2 is a similar showing illustrating a further embodiment of the tachograph.

Referring now to Figs. 1 and 2 of the drawings, the tachograph according to the invention comprises a casing 1 with a hinged lid 2. The metering device for speed, for periods of motion and rest, and for mileage is housed in the casing 1 and is provided with recording pencils 4, 5 and 6. An additional meter 7 for the r.p.m. of the motor can be housed in the casing 1, as shown in Fig. 1, when it is installed together with the other component parts; if it is to be added later, it may be housed in an additional portion 7a, as shown in Fig. 2.

Figure 4:
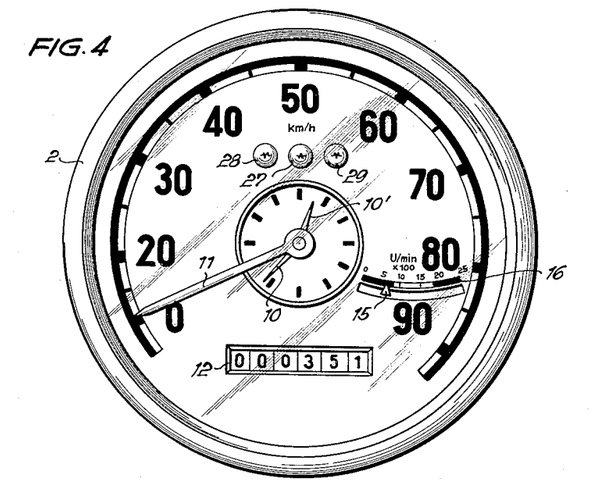
Fig. 4 shows the tachograph in front elevation.

In the lid 2, a clockwork 8 is arranged which drives a recording disk 9 connected thereto in proper sequence, and at the same time indicates time with its hands 10 and 10' at the front of the tachograph, as shown in Fig. 4. The speed at which the vehicle moves, is indicated at each moment by a hand 11, the mileage traveled by a drum indicator, shown in the window 12.

Also arranged in the lid 2 is a pivoted recording lever 13 whose recording point 14a registers the r.p.m. of the motor on the rear face of disk 9.

As shown in Fig. 1, the recording lever 13 carries a hand 15 moving over a lateral scale 16. The latter is provided with colored sections indicating the ranges above and below the admissible r.p.m.

Figure 3:
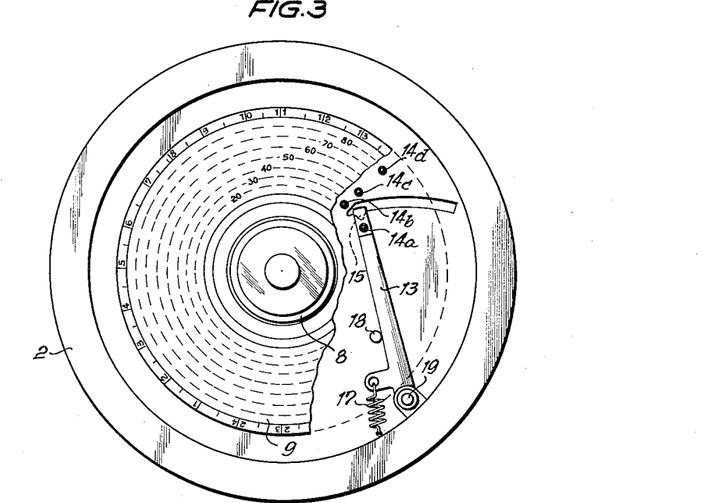
Fig. 3 is a view of the lid of the tachograph seen from the inside, with the dial partly removed.
Figure 5:
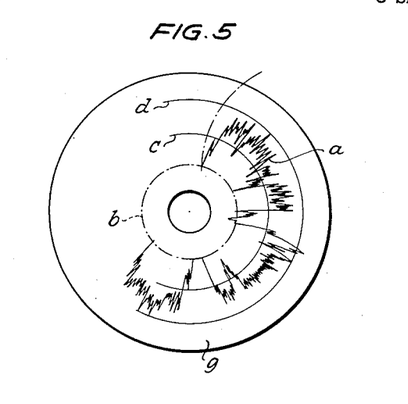
Fig. 5 is a rear elevation of the dial with recorded r.p.m.'s.
Figure 6:
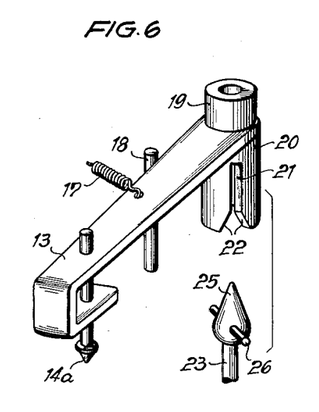
Fig. 6 is a perspective view of the r.p.m. recorder with coupling.
Figure 7:
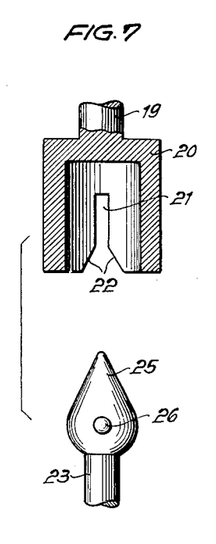
Fig. 7 is the automatic coupling in section.

The recording lever 13, which in its position of rest is drawn toward a stop 18 by means of a spring 17 (Fig. 3), carries at its pivot 19 a coupling sleeve 20 with a slot 21 and guiding edges 22 (Figs. 6 and 7). Sleeve 20 is engaged when lid 2 is closed by a pear-shaped coupling member 25 by way of a coupling pin 26, said member 25 being arranged on a meter shaft 23 of the metering device 7 or on an intermediate shaft 24 (Fig. 2). When the lid 2 is opened, the recording lever 13 is pulled to zero position by its spring 17 against stop 18, so that the recording pencil 14a describes a circular zero line on the rear face of disk 9. In this way, the opening of the tachograph is clearly indicated, so that the conventional indication of opening, by making an incision in the disk, may be dispensed with. When the lid 2 is closed again, the coupling sleeve 20 slides over the coupling member 25 and is pivoted by the guiding edges 22 and the coupling pin 26 into the correct angular position even at high motor speed. As a consequence, the recording pencil 14a draws an r.p.m. curve a, as shown in Fig. 5. In order to be capable of measuring the r.p.m. drawn, a circular zero line b is described on the rear face of the dial by means of another recording pencil 14b, fixedly arranged in lid 2. Finally, further recording pencils 14c and 14d, fixedly secured in lid 2 but having adjustable points, describe circular lines c and d as maximum and minimum r.p.m.'s of the motor.

In this way, it may be seen at a glance whether or not the driver has exceeded the admissible r.p.m.'s of the motor or has remained below them, and at what time, for what mileage, and over what driving period this has occurred.

In order to denote the operational state of the vehicle, there are three signal lamps 27, 28 and 29 provided at the front of the tachograph. When it is desired to provide only a single lamp 27, as usual, this can be done in the manner shown in Fig. 8. In this case, the lamp may be connected to a source of current 33 by way of a line 30, and via two parallel branches 31 and 32. In the upper branch 31, there is a switch 34, which is closed by a cam 35 connected to the metering shaft of the tachometer when the admissible speed is exceeded. In this case, the signal lamp 27 is switched on. In the lower branch 32, there is a circuit breaker 36 and a switch 37. The circuit breaker 36 is closed and opened respectively by a cam 38 which revolves in accordance with the r.p.m. of the motor. Switch 37 is operated by two cams 39 and 40 connected to the metering shaft of the r.p.m.; the two cams are adjustable with respect to each other angularly, cam 39 being actuated upon the r.p.m. reaching its admissible maximum, whereas cam 40 is actuated upon the r.p.m. reaching the admissible minimum. Therefore, the lamp flickers in a slow rhythm when the r.p.m. drops below the admissible minimum, whereas it flickers at a rapid rate when the r.p.m. rises above the admissible maximum.

Figure 8:
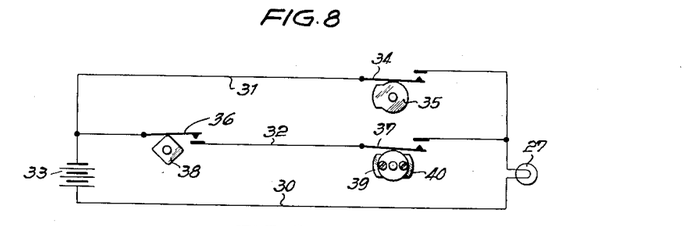
Fig. 8 is a wiring diagram for controlling the optical signals when only one signal lamp is present.
Figure 9:
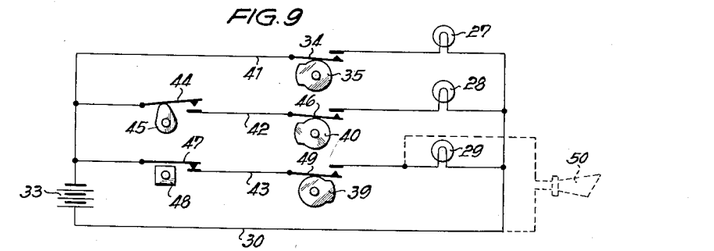
Fig. 9 is a wiring diagram for the control of optical and, if desired, acoustical signals, with three signal lamps.

When the three signal lamps 27, 28, and 29 shown in Fig. 4 are used, the circuits shown in Fig. 9 are applied. In these the lamps are all connected by line 30 to battery 33, and are individually connected thereto by branches 41, 42, and 43, respectively. In the upper branch 41 which corresponds to line 31 in Fig. 8, there is again a switch 34 controlled by a cam 35 in dependence on the speed of the vehicle, which is capable of lighting signal lamp 27 permanently. In branch 42 there is a circuit breaker 44 which is opened and closed at longer intervals by a cam 45 revolving at constant r.p.m. and having for instance one actuating lift. Also in this branch there is a switch 46 which is closed by a cam 40 dependent on the r.p.m., when the latter drops below the admissible minimum. In this case, the signal lamp 28 flickers in slow rhythm.

In branch 43, there is a circuit breaker 47 controlled by a cam 48 revolving at constant r.p.m. and having four lifts, as well as a switch 49 which is closed by the cam 39 depending on the r.p.m., as soon as the admissible maximum is exceeded. In this case, the signal lamp 29 flickers in rapid rhythm.

In order to call the driver's attention to the danger incurred at this time, the lamp 29 may have connected in parallel an acoustical signal 50, for instance a buzzer, a horn, or the like. Of course, it is possible to have a buzzer or a horn connected in parallel with any one of the lamps or to use acoustical signals instead of the optical lamp signals.

The invention as described may also be used in connection with tachographs in which the recording sheets are not driven in dependence on speed, but in dependence on mileage. In this case, the recording device which registers the traveled distance, has to be replaced by a clock-driven time recorder.

As mentioned in the beginning, other characteristic data in addition to the figures for the r.p.m. are preferably registered, particularly the gear speed changes taking place. It is known that the selection of the proper gear speed chosen in view of economical performance of the vehicle, has so far been left to the judgment of the driver except for vehicles provided with completely automatic gears. However, it is not always easy to make the right choice under difficult circumstances. It is now possible to provide the vehicle with a device which selects automatically the proper gear speed in dependence on the load and the driving speed, or the r.p.m. and overall performance of the vehicle, and which informs the driver of change of gear in the tachograph by additional lamps, buzzers, or other optical or acoustical signals, if necessary also recording such changes. The device may be so constructed that the gear change is done automatically and the driver informed of the gear change by indications on the tachograph, or it can advise the driver by proper signalling to carry out the change of gear manually when the necessity occurs.

For this purpose, similar arrangements may serve, as shown in Figs. 8 and 9, by actuating the switches which light the lamps not only in dependence on the r.p.m. and the speed of the vehicle, but also in dependence of the torsional moment or the motor output. Since both these latter factors are hard to measure, the signals are controlled by the position of the lever for motor regulation (accelerator, the control lever for the priming pump, etc.) or by some other characteristic factor, primarily the reduced pressure at the suction line. This can be done by actuating the switches controlling the signal lamps by appropriately designed gearings, for instance by cam or lever-controlled drives.

Finally, the arrangement according to the invention may also be used in tachometers measuring speed only.

Figure 10:
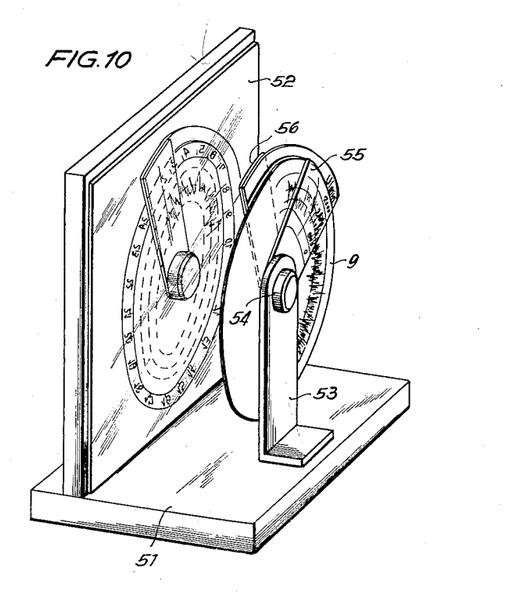
Fig. 10 is an evaluation device in perspective view.

In Fig. 10 a device is shown for evaluating the findings on recording disks. It comprises a base plate 51 supporting a mirror 52 in front of which a bracket 53 with a shaft 54 is arranged. The recording disk 9 to be evaluated is rotatably arranged in such a way that its rear face is reflected by the mirror 52. Embracing part of disk 9, a rotating slide with two interconnected arms 55 and 56 of transparent material is arranged on shaft 54. The two arms 55 and 56 and their markings, respectively, are offset by the difference of the angle between the two recording pencils arranged at the front and rear side of the disk. Consequently, a correct comparison of the two recordings at the front and rear side is possible without any difficulty.

The characteristic values recorded and the switching operations carried out by the driver are further registered, if desired, on special recording areas at the front and rear faces of the disks for subsequent checking.

Since, for the investigation of causes of accidents, it is of prime importance to indicate whether the driver actuated the brake or not, at what time and in what manner this was done, additional arrangements are provided for the indication and registration of braking operations. In addition to the time at which braking took place, and the period over which it was continued, the magnitude of the braking force is also very important, and all these data are registered. The actuation of a foot-brake and of a hand brake may also be recorded.

It is a known fact that the use of a motor-actuated brake in motorized vehicles makes it possible to dispense with a change to lower gear speed which becomes necessary, for instance, for abrupt braking in the case of a hazardous descent, and yet to achieve better braking than by such gear change. It is, therefore, particularly important to record the actuation of the motor brakes increasingly used in heavy trucks and buses, and it is in some cases sufficient to indicate and register the braking action of these brakes. For purposes here concerned, it is not important what kind of motorized brake is used; the brake may for instance be one which influences the motor shaft, or the cam, or the exhaust, and it does not matter whether it is operated electrically, electromagnetically, pneumatically, hydraulically, electropneumatically, or electrohydraulically. In each case, it is feasible for the driver to indicate and record the braking action, as well as the braking pressures, applied.

In a case like this, the braking pressure can be recorded in several steps by subsequent operation of several indicating and recording elements associated with the several steps, or they may be recorded by a single measuring and recording device changing its deflection in accordance with the height of the braking pressure. Such means are too well known to be described here in detail. For housing the recording pencils and their actuating parts in the tachograph, the means described in Figs. 1–9 may be used with appropriate changes.

As a particularly suitable means for the simultaneous indication of additional operational data on the same recording sheets, we provide the use of sheets, in the form of bands or disks, on both sides, since it was possible after considerable effort to make such sheets available; this applies particularly to colored sheets covered on both sides with wax. However, it is not intended to limit the invention to any particular kind of recording sheets. It is also possible to use, for instance sheets which have been prepared for recording on both sides by metal spraying or plating, graphite application or other mechanical, electrical or chemical treatment.

Such recording sheets may also be used advantageously, when, in view of the exceedingly large number of data to be registered, it is advisable to use several synchronized recording sheets, or when due to the small number of data to be recorded, only one side of a disk is to be used. Since recording sheets which can be used on both sides are only slightly more expensive than those which can only be inscribed on one side, the former sheets are by far more economical in use. The decrease to one half in storage space with fewer sheets to be kept, and the better organization of data to be checked, make the use of the sheets for receiving recordings on both sides much more desirable.

The present invention does not limit the use of sheets on which recordings can be made on both sides, for application in tachographs. Such sheets may be used with the same advantage for any type of a recording device for the control of one or several technical, physical, or chemical measurements and indications of performance.

As an example, we may mention the control of operations and outputs in machine tools and processing machines, the recording of electrical voltages, current intensities and outputs in different departments of a plant or a net, the recording of loads distributed in different sections of power stations or substations, the control of pressures in physical and technical tests and plants, the recording of the different gas components in the atmosphere of work rooms, indication of humidity in air conditioning sets, of the carbon monoxide contents in chimney gases, the registration of temperature in rooms or in operations requiring heat treatment, and many more. In other words, the use of recording sheets to be inscribed on both sides is applicable to any kind of registration and measurement desired.

In order to render the graduated scale for the additional data particularly conspicuous and to make the reading of such data, particularly the r.p.m. of the motor, more accurate, the scale is arranged at a conspicuous place of the dial in the central longitudinal axis of the device, more particularly in the free space between the ends of the speed scale, with simultaneous enlargement of the graduation. The associated indicator or marker is preferably concentrically mounted with the other hands for indicating time and speed, said indicator being connected by a push rod journalled at its rear end with a point of a recording lever whose position corresponds to a ratio increasing the deflection of the indicator.

For further improving the reading of the scale according to a further embodiment of the invention, the indication of data is limited to a particularly important measuring range, for instance to higher r.p.m.'s of the motor in the danger zone, while the indication of other data is suppressed. This can be done for instance by attaching the push rod, which is journalled to the indicator, to the recording lever by a longitudinal slot and placing it under spring action. Depending on the length of the slot and the direction of the spring force, a smaller or larger part of indications in the upper or lower measuring range will be eliminated.

If it seems desirable to eliminate part of the measuring range in the recording as well, this can be accomplished, in a manner known per se in measuring devices, by appropriately pretensioning the measuring spring.

Finally, the angle of the indicator can be increased by providing the recording lever with a toothed segment which engages with a gear connected with the indicator. The magnitude of the angle of deflection is adjustable as desired, by appropriate selection of the gear ratio.

Figure 11:
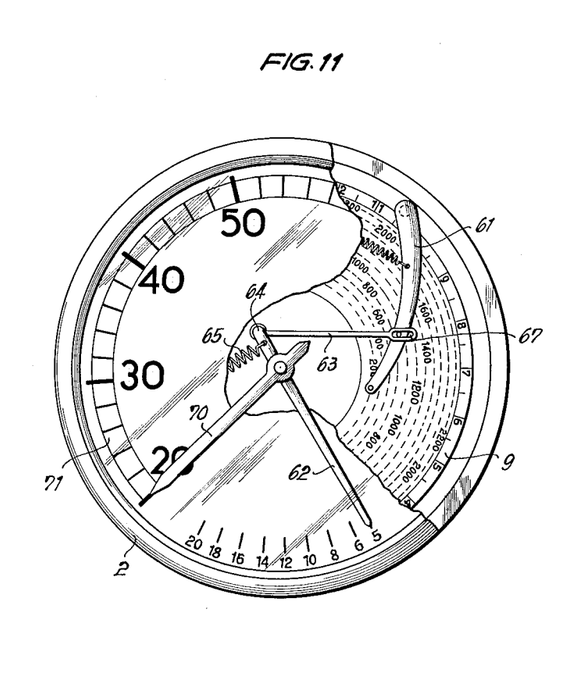
Fig. 11 is a top plan view of the tachograph having a scale for reading additional operational data.
Figure 12:
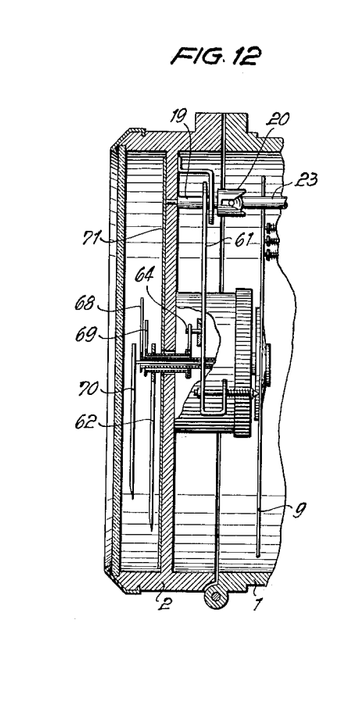
Fig. 12 is a cross-section through the tachograph according to Fig. 11.
Figure 13:
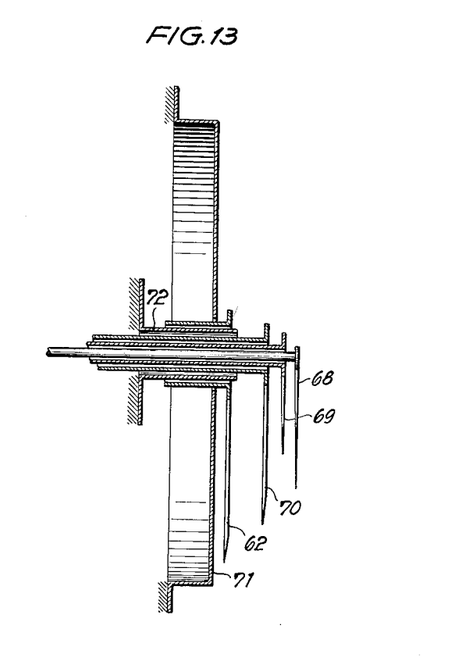
Fig. 13 is a diagrammatic showing of the arrangement of several hands.

A tachograph, as shown in Figs. 11–13, has a spring-actuated recording lever 61, which notes the r.p.m. of the motor on the rear face of the recording disk. Lever 61 is connected to a push rod 63 journalled to an indicator or marker 62. The push rod acts at the rear end 64 of the marker 62 where at spring 65 tends to maintain it in position of rest. On the other hand, push rod 63 is connected with the recording lever 61 over a slot 67. Consequently, in the arrangement shown, indication of data is eliminated in the lower r.p.m. range and only the higher values are indicated by the marker 62. If, on the other hand, it is desirable to suppress indication in the upper r.p.m., it is only necessary to reverse the action of spring 65. The magnitude of the range to be suppressed can be varied by proper selection of the length of slot 67.

In the illustration according to Fig. 11, the marker 62 is mounted on the shaft of the hour-hand. This has the disadvantage that upon inversion of the r.p.m. changes the hour-hand taken along by marker 62 oscillates by larger or smaller angles, depending on the pitch of the gear teeth.

In order to avoid this disadvantage, the embodiment shown in Fig. 13 is provided, in which the marker 62 may be mounted on a sleeve 72 surrounding the hollow shafts of the clock hands 68 and 69 and of the speedometer-hand 70, said sleeve being secured to the front plate of the tachograph (not shown). The hands 68, 69, 70, as well as the marker 62 move in front of the dial 71.

It has been mentioned before that the tachograph may be provided with additional devices which serve for indicating and recording other data important for the control of the performance of the vehicle, more particularly the r.p.m. and/or the gear change. These additional devices are so arranged that they record the additional data on the rear face of the recording disks. It is possible to do this in several ways. It is either possible to leave the rear face of the recording disk or disks without inscriptions and to record only, during operation, reference curves by additional stationary or adjustable recording instruments, said curves indicating the zero value as well as maximum and minimum values of the r.p.m. In another embodiment, the rear face of the disk or disks may be provided with imprinted registration areas for the additional data. In order to avoid preparing the disks on both faces with a wax coating and at the same time printing them with necessary reference lines on both sides, according to a further embodiment of the invention the arrangement of a special recording disk is made for recording of further operational data, which additional disk is arranged at the rear face of the ordinary recording disk used for registering the speed, the periods of movement and of rest, and the mileage of the vehicle. The additional recording disk may or may not be provided with printed recording areas. In order to secure the additional disk in its position with respect to the disk support and the associated main disk, it may be made with holes of particular shape, preferably with square holes.

In order to secure the mutual position of the two recording disks which are in back-to-back position, it is possible to secure them fixedly to each other, at least during operation. They may, for instance, be glued together or connected by means of adhesive tape in a manner similar to the one used in tachographs with several recording disks to be inscribed in succession. Preferably the two associated disks comprise two sheets which are only connected at one point by a small land. The disks may, therefore, be processed simultaneously while they are punched, covered with wax, and imprinted. This results in a simplification and in a saving of expenses during the manufacture. More important still, this has the advantage that the simultaneously imprinted disks—assuming that the imprints are neatly done—will exactly coincide when superposed in their graduation. Consequently, the mutual adjustment required when loose disks are later put together by gluing or by the use of adhesive tape, can be dispensed with. Furthermore, the common evaluation is simpler, faster, and more accurate. Finally, no confusion can occur between the disks, and the storage of disks which belong together is assured.

Figure 14:
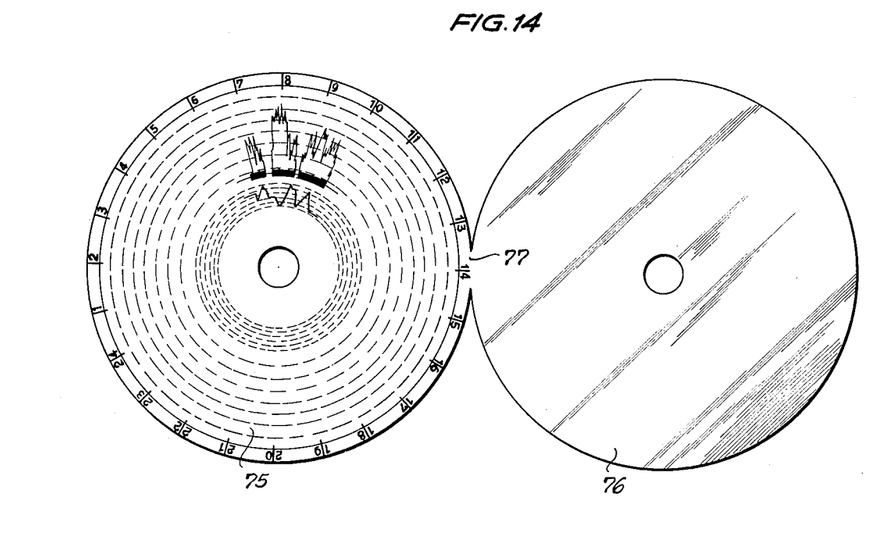
Fig. 14 illustrates two interconnected dials.

Fig. 14 shows a disk 75 connected by a small land 77 with a disk 76; disk 75 is inscribed with the usual tachograph markings, whereas disk 76 serves for the additional data to be recorded. The latter disk is without any imprint, but it is understood that it has a surface capable of receiving recordings such as a wax coating indicated in the drawing by dot and dash line. As explained above, the disk is inscribed during operation with reference lines by stationary recording pencils. Preferably it is provided with imprinted recording areas.

Instead of using recording disks having front and rear faces for the registration of operational data, according to a further embodiment of the invention one or several auxiliary recording disks are used for the recording of additional data, such as r.p.m., acceleration, position of signal arms, and the like, which auxiliary disk or disks are mounted on the shaft of the main recording disk, spaced axially at a short distance from each other. Such an arrangement facilitates the comparison of corresponding recordings quite considerably and allows the registration of yet a larger number of additional operational data, such as acceleration, position of signal arms, position of gas pedal, motor load, and others.

It is advisable to arrange the writing devices for making recordings on the additional recording disks in such a manner that they may be moved into and out of the space between the main disk and the auxiliary disk or disks. When the writing devices are so arranged that they make recordings from the same side in the same sense, then a comparison between associated recordings is possible without difficulties. The easy detection of recordings which belong together in time is sometimes very important for certain data, whereas it is less essential for others. In such cases, it is possible to provide further writing devices for additional operational data, which make imprints on the rear faces of the recording disks, opposing in sense. To facilitate the housing of the several writing devices, more particularly where several additional recording disks are used, it is possible to arrange the writing devices in staggered position, whereby it is advisable to have the writing devices which make imprints on several disks in the same sense arranged at the same place in superposed relationship.

The additional data may be recorded either completely or in part on additional areas of the main recording disk. The corresponding markers are preferably coupled with the shafts driving the writing devices, directly or by means of lever systems.

Figure 15:
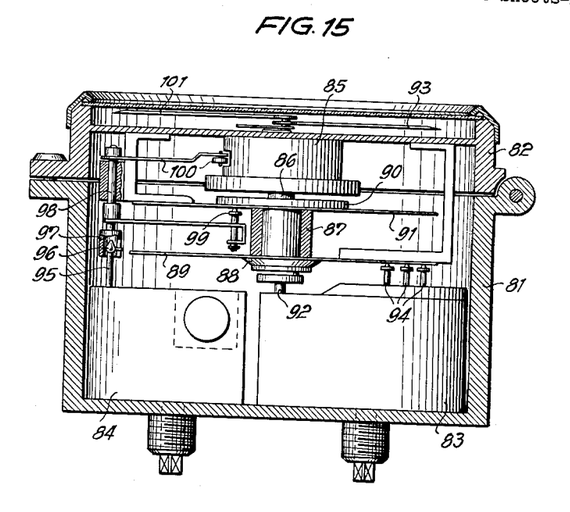
Fig. 15 is a cross-section through a tachograph according to the invention with several dials arranged behind each other in succession.
Figure 16:
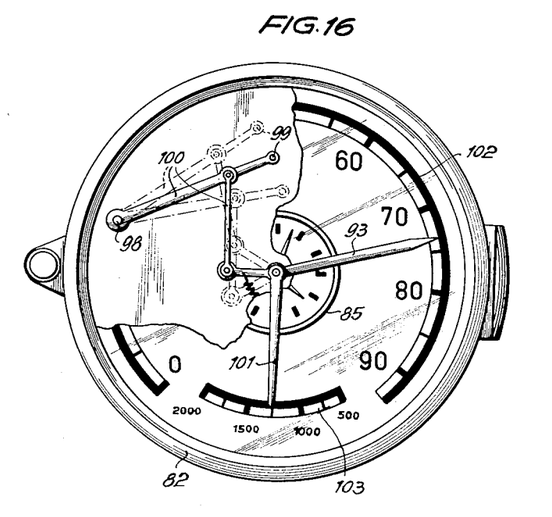
Fig. 16 is a top plan view of the tachograph according to Fig. 15 with partly removed dial.

The embodiment of the tachograph shown in Figs. 15 and 16, has a potshaped casing 81 and a tiltable lid 82. In the casing 81 are housed the speedometer 83 and the meter 84 for the r.p.m. of the motor, whereas a clockwork 85 for indicating the time of the day and for rotating the recording disks in proper sequence, is arranged within the lid 82. On a shaft 86 of the tachograph, recording disks 89 and 91 are mounted, spaced by a sleeve 87; disk 89, which serves for recording speed, is mounted on a plate 88, and disk 91, which records the r.p.m. of the motor, is mounted on a plate 90.

The metering device 83, which, in a manner known per se, drives the speedometer 93 from the shaft 92 acts on one of the three pencils 94, inscribing disk 89 from the lower side; the two remaining pencils record, likewise in a manner known per se, the mileage and the performance of the vehicle.

The metering device 84 drives a shaft 95, which upon closure of the lid, automatically engages a shaft 98 housed in the lid 82 by way of a pear-shaped member 96 and a coupling sleeve 97. The shaft 98 carries a writing device 99 movable into the space between disks 89 and 91, said writing device making recordings on disk 91 from below.

A marker 101 is connected to shaft 98 by way of a system of levers 100 journaled to said shaft, the marker 101 indicating the r.p.m. of the motor on a scale 103 arranged below the speedometer scale 102.

We claim:

1. In a tachograph, in combination, a housing; a lid closing said housing and enclosing a given space therewith, said lid being movable with respect to said housing to a position opening the latter; a pair of recording means; means mounting said pair of recording means in said space, said pair of recording means, when said lid closes said housing, recording different sets of information on different surface portions of sheet means carried by said lid, one of said recording means including a recording lever carried by said lid, said sheet means being in the form of a single sheet carried by said lid and said pair of recording means cooperating with opposite faces of said sheet, respectively.

2. In a tachograph, in combination, a housing; a lid closing said housing and enclosing a given space therewith, said lid being movable with respect to said housing to a position opening the latter; a pair of recording means located in said space, when said lid closes said housing, for recording different sets of information on different surface portions of sheet means carried by said lid, one of said recording means including a recording lever carried by said lid, said sheet means being in the form of a pair of substantially coaxial sheets defining a space between themselves and carried by said lid, said pair of recording means respectively cooperating with said pair of sheets and said lever of said one recording means being located in said space between said sheets.

3. In a tachograph, in combination, a housing; a lid closing said housing and being movable with respect thereto to a position opening said housing, said lid enclosing a given space with said housing when the latter is closed by said lid; means carried by said lid for supporting recording sheet means in said space when said housing is closed by said lid, said sheet means having first and second information-receiving portions respectively located in first and second, mutually spaced, parallel planes; first recording means carried by said housing for recording a first set of information in said first plane on said first portion of said sheet means when said lid closes said housing; second recording means; and means supporting said second recording means in part by said housing and in part by said lid for locating said second recording means in a position for recording a second set of information in a second plane on said second portion of said sheet means when said lid closes said housing.

4. In a tachograph as recited in claim 3, said second recording means recording engine speeds on said second portion of said sheet means.

5. In a tachograph, in combination, a housing; a lid closing said housing and enclosing a predetermined space therewith, said lid being movable with respect to said housing to a position opening the latter and said lid having a wall formed with an arcuate slot passing there-through, said wall having a surface directed away from said space when said lid closes said housing; a recording lever located in said space when said lid closes said housing and carried by said lid for turning movement about an axis which includes the center of curvature of said slot; a scale located at said surface of said wall along said slot; an index member carried by said lever, passing through said slot, and cooperating with said scale; means carried by said lid for supporting a recording sheet in said space when said lid closes said housing; inscribing means carried by said lever for inscribing movements thereof on said sheet; and a meter carried by said housing and cooperating with said lever for turning the latter when said lid closes said housing, whereby the operation of said meter is simultaneously recorded on said sheet and indicated at said scale.

6. In a tachograph, in combination, a housing; a lid closing said housing and enclosing a given space therewith, said lid being movable with respect to said housing to a position opening the latter; a recording lever turnably carried by said lid and located in said space when said housing is closed by said lid; lever means also located in said space when said housing is closed by said lid and having a turning axis parallel to that of said recording lever; a motion transmitting rod connected to said lever means to be moved by the latter when said lever means turns, said rod having a portion overlapping said recording lever and formed with a slot; a pin fixed to said recording lever and located in said slot so that turning of said lever means by said rod and said recording lever will not commence until said pin is located at an end of said slot, said lid having an interior portion visible from the exterior of the tachograph when said lid closes said housing thereof; a dial located in the visible portion of said lid and having at least a pair of different scales arranged along different arcuate portions of a circle; a first pointer fixed to said lever means for turning movement therewith about said turning axis thereof and cooperating with one of said scales; and a second pointer concentric with said first pointer and cooperating with the other of said scales.

7. In a tachograph, in combination, a housing; a lid closing said housing and being movable with respect thereto to a position opening said housing, said lid enclosing a given space with said housing when the latter is closed by said lid; means carried by said lid for supporting recording sheet means in said space when said housing is closed by said lid, said sheet means having first and second information-receiving portions respectively located in first and second, mutually spaced, parallel planes; first recording means carried by said housing for recording a first set of information in said first plane on said first portion of said sheet means when said lid closes said housing; second recording means; means supporting second recording means in part by said housing and in part by said lid for locating said second recording means in a position for recording a second set of information in said second plane on said second portion of said sheet means when said lid closes said housing, said lid having an inner portion visible from the exterior of the tachograph when said lid closes said housing; a dial located in said visible portion of said lid, visible from the exterior of the tachograph, and having a pair of different scales respectively located at different arcuate portions of a circle; and a pair of concentric pointers turnable about a common axis passing through the center of said circle and respectively cooperating with said scales, one of said pointers being operatively connected with said second recording means.

8. In a tachograph, in combination, a housing; a lid closing said housing and enclosing a given space therewith, said lid being movable with respect to said housing to a position opening the latter; a pair of recording means respectively including a pair of recording levers located in said space, when said lid closes said housing, for recording different sets of information on different surface portions of sheet means carried by said lid, said substantially coaxial sheet means being in the form of a pair of sheets defining a space between themselves and carried by said lid, and said pair of recording means respectively cooperating with said pair of sheets and the lever of one recording means being located between said sheets.

9. In a tachograph, in combination, a housing, a lid closing said housing and enclosing a given space therewith, said lid being movable with respect to said housing to a position opening the latter, recording chart means, means mounting said recording chart means within the given space, said recording chart means having a lid side and a housing side, a recording lever, means locating said recording lever in said space on the lid side of said recording chart means when the lid is closed, first measuring means, means connecting said recording lever to said first measuring means, second measuring means, a second recording lever located at the housing side of said recording chart means, means connecting said second recording lever to said second measuring means, and inscribing means carried by said recording levers for inscribing movements thereof with respect to said housing on opposite sides of said recording chart means.

References Cited in the file of this patent
UNITED STATES PATENTS

| 506,406 | McLauthlin et al. | Oct. 10, 1893 |
| 873,321 | Lyon | Dec. 10, 1907 |
| 1,061,121 | Quertier | May 6, 1913 |
| 1,089,695 | Cutter et al. | May 10, 1914 |
| 1,264,277 | Cook | Apr. 30, 1918 |
| 1,411,698 | Hepler | Apr. 4, 1922 |
| 1,515,913 | Uberroth et al. | Nov. 18, 1924 |
| 1,864,566 | Walter | June 28, 1932 |
| 1,925,325 | Keller | Sept. 5, 1933 |
| 1,983,887 | Viall | Dec. 11, 1934 |
| 2,124,832 | Schofield | July 26, 1938 |
| 2,261,770 | Kusinitz et al. | Nov. 4, 1941 |
| 2,244,653 | Meer | June 3, 1941 |
| 2,567,425 | Dillon | Sept. 11, 1951 |
| 2,650,518 | Zaroff et al. | Sept. 1, 1953 |
| 2,739,031 | Meer | Mar. 20, 1956 |
| 2,746,352 | Estey | May 22, 1956 |
| 2,749,205 | Schmitt | June 5, 1956 |
| 2,751,580 | Stump | June 19, 1956 |
| 2,828,179 | Poncelet | Mar. 25, 1958 |

FOREIGN PATENTS

| 302,777 | Great Britain | Dec. 27, 1928 |

OTHER REFERENCES

Ser. No. 352,111, Fornbacker (abandoned) (A.P.C.), published May 25, 1943.